Figure 1:
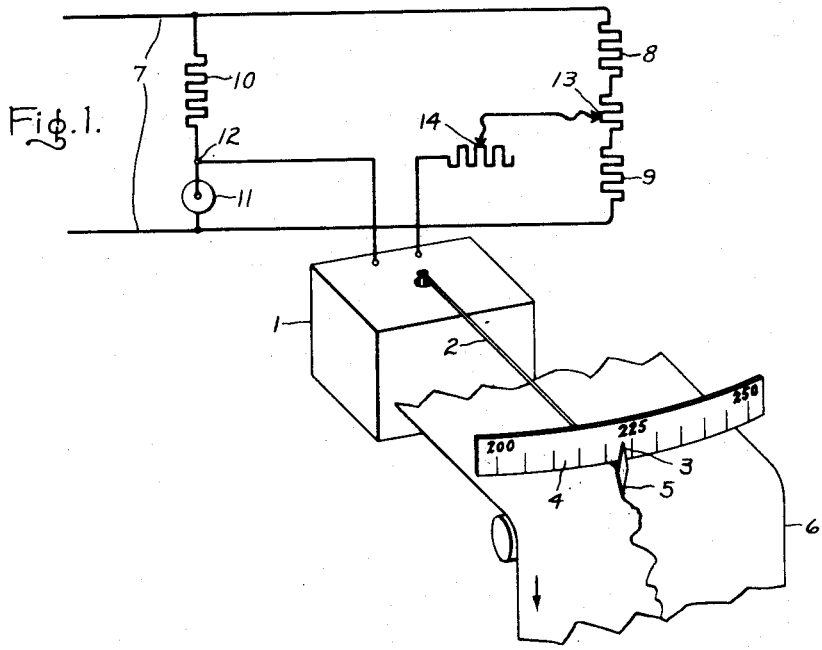

Oct. 17, 1950     H. H. CHAMBERLAIN     2,526,329

EXPANDED SCALE ELECTRONIC VOLTMETER

Filed Oct. 27, 1948

Inventor
Harvey H. Chamberlain
by    *Prunell H. Mack*
His Attorney

Patented Oct. 17, 1950

2,526,329

UNITED STATES PATENT OFFICE 2,526,329

EXPANDED SCALE ELECTRONIC VOLTMETER

Harvey H. Chamberlain, Marblehead, Mass., assignor to General Electric Company, a corporation of New York Application October 27, 1948, Serial No. 56,698

5 Claims. (Cl. 171—95)

My invention relates to expanded scale electrical measuring instruments and in particular to a regulating circuit for voltmeters, to obtain a linear expanded scale response when employing a voltmeter which is entirely conventional except the scale.

The features of my invention which are believed to be novel and patentable will be pointed out in the claims appended hereto. For a better understanding of my invention reference is made in the following description to the accompanying drawing which illustrates a recording and indicating voltmeter and the circuit connections therefor, for obtaining an expanded scale response.

Referring to the drawing, 1 represents an ordinary direct current voltmeter, having a recording and indicating pointer arm 2 having an index 3 moving over and indicating on a scale 4, and a stylus 5 moving over and recording on a moving chart 6. The mechanism for moving the chart is not fully illustrated, as it constitutes no part of my invention. In order to give a practicable example of the use of my invention, it will be assumed that the direct current voltage source 7 is subject to a variation over a range from 200 to 250 volts, and that it is desired to indicate and record such variation on a linear expanded scale basis where the upper and lower limits of the scale correspond to 250 and 200 volts, respectively. Accordingly, the scale 4 is so graduated, 200 corresponding to the zero of such scale. Since voltmeter 1 is otherwise conventional, it is to be energized at zero voltage when the voltage source 7 is at 200 volts. The results desired are obtained by a simple voltage regulating circuit connected between the voltmeter and the source 7. Such circuit consists of a bridge having resistance arms 8, 9 and 10, and a fourth arm comprising a voltage regulating tube 11. Resistance arms 8 and 9 are connected in series across source 7, and resistance 10 and tube 11 are connected in series across the source 7, and the voltmeter is connected across the bridge circuit from a point 12 between the resistance 10 and tube 11 and a point 13 which may require initial adjustment and is, therefore, shown adjustable between resistances 8 and 9. That portion of the adjustable resistance shown at 13 which is above the connection will be considered as a part of resistance 8, and that portion which is below the connection at 13 will be considered as a part of resistance 9. There is also an adjustable resistance 14 included in the voltmeter connection which may be considered as a part of the voltmeter resistance. The resistances at 13 and 14 will not require adjustment after initial calibration and if a correct combination of resistances is otherwise initially employed, these adjustable resistances may be omitted. The resistances 8, 9, 10 and 14 referred to are ordinary linear resistances.

The voltage regulating tube 11 is a glow tube which, as is known, will maintain the voltage across it constant when included in a resistance circuit, and the voltage distribution is such that the glow tube voltage is above its breakdown point. For the particular voltage measurement range specified, the resistance 10 may have 10,000 ohms and the tube 11 will be selected so that it conducts current and the voltage across it will be 105 volts when the voltage of source 7 is anywhere between 200 and 250 volts. Between these limits the current through the circuit 10—11 will vary, but the voltage variation will occur across resistance 10 and the voltage across tube 11 will remain constant at 105 volts.

The relation between resistances 8 and 9 is made such that at 200 volts across 7 the voltmeter circuit connecting point at 13 is also at 105 volts; or so that 105 volts exist across resistance 9, and 95 volts exist across resistance 8. Hence, at 200 volts, line points 12 and 13 are at the same voltage and no current flows in the voltmeter circuit, and it indicates 200 on scale 4 which is the zero deflection point of the voltmeter. This condition is obtained, if necessary, by adjustment of the tap at 13 which may be considered the zero scale adjustment. Now for higher values of line voltage, the voltage across tube 11 will remain at 105 volts but the voltages across resistances 8 and 9 will both increase, so that point 13 will be at a higher voltage than point 12 and a current will flow in the voltmeter circuit. With 250 volts line the resistance of the voltmeter circuit is adjusted as necessary to cause the voltmeter to deflect to full scale or 250 on scale 4. The adjustment at 14 may be considered the full scale adjustment. Under this condition the current which flows through resistance 10 and that which flows in the voltmeter circuit will add and flow through tube 11. However, this does not change the voltage across tube 11, which remains at 105 volts in the example given.

At line voltages which lie between 200 and 250, the voltmeter will have proportional intermediate deflections, and the scale 4 is calibrated accordingly from 200 to 250. Using a voltmeter which, including the resistance at 14, has a resistance of 3000 ohms and requires a full scale current of 0.005 ampere, practical values of resistances 8 and 9 are 4280 and 4720 ohms, respectively.

While it is not intended that the arrangement of Fig. 1 will be energized below 200 volts line for measurement purposes, it is apparent that if the line voltage drops below 200, the instrument 1 will tend to read backwards due to a reverse current flow therethrough. It follows, therefore, that I may substitute for the instrument 1 an instrument of the zero-center scale type calibrated from 200 volts upward to the right of the mechanical zero and from 200 volts downward to the left of the mechanical zero. Such an instrument and its connections are represented in Fig. 2 at 1a. Assuming the circuit constants are the same as in Fig. 1, zero current will flow through the voltmeter 1a at 200 volts line, and the armature of the voltmeter will be biased by usual centering lead-in spirals so that its pointer 2a will indicate at about midscale for this zero current condition, and such indication will be marked "200" volts on the scale 4a. For voltages above 200 the pointer will deflect to the right, the voltmeter current being represented by the single-headed arrows; and for voltages below 200 the pointer will deflect to the left, the voltmeter current being represented by the double-headed arrows. The lower limit of measurement will be the voltage where the glow tube 11 ceases to conduct and will be in the neighborhood of 125 volts line, and its breakdown point will require a somewhat higher voltage. Thus it may be assured that the glow tube will always conduct for line voltages which are above 150, and this instrument may therefore be calibrated over a range from 150 to 250 volts line, which corresponds to a small negative to a small positive voltage across the instrument itself.

It follows from the two instrument calibrations described in connection with Figs. 1 and 2 that another expanded scale instrument calibration corresponding to the range from 150 to 200 volts could be used by providing the instrument with the necessary bias and a scale calibrated only over such range. To conform with conventional instrument scale readings, the zero current 200 volt scale calibration of this last-mentioned instrument would be at the right of the scale, and the instrument would deflect downscale to the left.

In any of the arrangements described the bridge connection of the voltmeter may be arranged to be opened when the voltage regulating glow tube is not conducting. And in Fig. 2, I have represented a relay 15 operated by the current through the glow tube 11 for maintaining the voltmeter bridge connections closed only when current flows through the glow tube. This will help to prevent erroneous voltage reading and possible damaging instrument current conditions when the line voltage is below that for which the measuring system is intended.

The current which flows in the voltmeter may be calculated from the known resistance components used in the circuit and from the fact that the voltage across the glow tube is of a known value and in the case described is 105 volts. Thus, in Fig. 1, when the line voltage $E$ rises above 200 volts, the current $i_1$ which flows in the voltmeter circuit may be determined as follows:

$$(1) \qquad i_1 = \frac{ER_9 - 105(R_8 + R_9)}{R_8 R_1 + R_8 R_9 + R_9 R_1}$$

where $E$ is the voltage of source 7, $R_9$ is the resistance of 9 including that part at 13 below the tap point, $R_8$ is the resistance of 8 including that part 13 above the tap point, $R_1$ is the resistance of the voltmeter circuit including that part of the resistance at 14 which is in the circuit The complete derivation of the Equation 1 is as follows:

$$(2) \qquad E = i_9 R_9 + i_1 R_8 + i_9 R_8$$

where $i_9$ is the current flow through $R_9$ which is equal to the current flow through $R_8$ (designated $i_8$) less $i_1$.

also $$(3) \qquad E = i_9 R_9 + i_1 R_8 + i_1 R_1 + 105$$

therefore $$(4) \qquad i_9 R_9 = i_1 R_1 + 105$$

$$(5) \qquad i_9 = \frac{i_1 R_1 + 105}{R_9}$$

Substituting the value of $i_9$ from Equation 5 in Equation 2, $$(6) \qquad E = \frac{i_1 R_8 R_1 + 105 R_8}{R_9} + i_1 R_8 + \frac{i_1 R_9 R_1 + 105 R_9}{R_9}$$

$$(7) \qquad ER_9 = i_1 R_8 R_1 + 105 R_8 + i_1 R_8 R_9 + i_1 R_9 R_1 + 105 R_9$$

$$(1) \qquad i_1 = \frac{ER_9 - 105(R_8 + R_9)}{R_8 R_1 + R_8 R_9 + R_9 R_1}$$

Since there are no nonlinear elements in Equation 1, the current distribution of the voltmeter will be linear.

Figure 2:
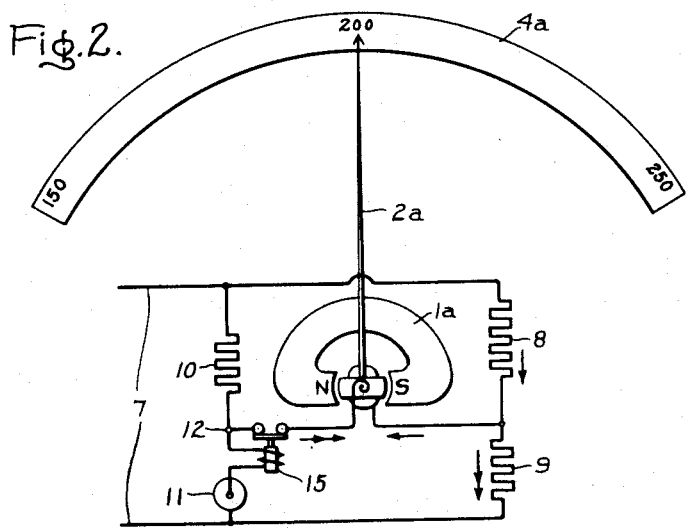
Figure 3:
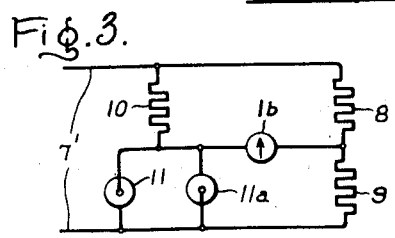

The same scheme may be used on A.-C. voltages by simply rectifying the A.-C. voltage before applying it to the D.-C. measuring circuit previously described, or a full-wave rectifier type of instrument may be used at 1 and a reversely connected glow tube added in parallel with the one shown in Fig. 1. This is represented in Fig. 3 where the parts are similar to those of Fig. 1, with the following exceptions: The source 7' is alternating instead of direct current. The voltmeter 1b is of the full-wave rectifier type, and another glow tube 11a is connected in parallel to glow tube 11 and reversely connected so that both half-waves of the A.-C. voltage will be regulated.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A system for measuring voltages over a measurement range above a given value on an expanded scale basis, comprising a four arm bridge having two pairs of opposite terminals one pair of which is adapted to be connected across the voltage to be measured, three arms of such bridge comprising linear resistances and the fourth arm comprising a voltage regulating glow tube, said glow tube having a voltage breakdown value less than the voltage corresponding to the low limit of the measurement range and such that it conducts current and establishes a fixed voltage across it when the voltage to be measured is within the measurement operating range of such system, and a voltmeter connected across the other pair of opposite terminals of said bridge, the resistance arms of said bridge having such values that the current through said voltmeter will be zero at one value of the voltage to be measured within the voltage measurement range.

2. A system for measuring voltages above a given value on an expanded scale basis, comprising a four arm bridge having one pair of opposite terminals adapted to be connected across the voltage to be measured, three arms comprising first, second, and third linear resistances and the other arm a voltage regulating glow tube, and a voltmeter connected across the remaining pair of opposite terminals of said bridge from a point between the first resistance and the glow tube to a point between the second and third resistances, said glow tube having a breakdown voltage such that current will flow through said first resistance and glow tube when the voltage to be measured is within the measurement range, said second and third resistance having such values that for a predetermined value of the voltage to be measured within the measurement range the current flow through the voltmeter will be zero and for other values of voltage within the measurement range current will flow through said voltmeter in proportion to the departure of such voltage from such predetermined value.

3. A system for measuring voltages over a measurement range above a given value on an expanded scale basis, comprising a four arm bridge having two pairs of opposite terminals, one of said pairs of terminals being adapted for connection across the voltage to be measured and a voltmeter connected across the other pair of opposite terminals, three of the arms of said bridge comprising linear resistances and the fourth arm of said bridge comprising a current conducting voltage regulator which maintains a fixed voltage across said arm when the voltage applied to the bridge is within the measurement range, the resistance arms of said bridge being chosen to produce zero voltage across said voltmeter when the voltage applied to said bridge is at one value within the measurement range, said voltmeter having a scale calibrated with said bridge in terms of the voltage to be measured.

4. A system for measuring voltage over a range above a given value on an expanded scale basis, comprising a bridge for connecting across the voltage to be measured having first, second, third, and fourth branches through which it is possible for current to flow in response to the voltage to be measured when the bridge is connected thereacross and such voltage varies over its measurement range, the first branch comprising first and second linear resistances, the second branch comprising a third linear resistance and a voltage regulating glow tube, the third branch comprising the first resistance, a voltmeter and said glow tube and the fourth branch comprising said third resistance, said voltmeter and said second resistance, said resistances and glow tube being so chosen in relation to the voltage measurement range that within such range the glow tube passes current at constant voltage and the voltage drop across the second resistance varies from a value below to a value above the voltage across the glow tube.

5. A system for measuring voltage over a range above a given value on an expanded scale basis, comprising a bridge adapted to be connected across the voltage to be measured, said bridge having first, second and third branches through which it is possible for current to flow in response to the voltage to be measured when such voltage varies over the measurement range and the bridge is connected thereacross, the first branch comprising first and second linear resistances, the second branch comprising a third linear resistance and a voltage regulating tube, and the third branch including a voltmeter connected from a point between the first and second resistances to a point between the third resistance and tube, the values of such resistances being so chosen in relation to the voltage measurement range and the regulating voltage of the tube that over such range the tube conducts current at constant voltage and at one value of the voltage to be measured within such range the voltage drop across said second resistance becomes equal to the voltage across said tube.

HARVEY H. CHAMBERLAIN.

REFERENCES CITED

The following references are of record in the file of this patent:

UNITED STATES PATENTS

| Number | Name | Date |
| --- | --- | --- |
| 2,440,283 | Levy | Apr. 27, 1948 |